United States Patent
Mascarenhas et al.

(10) Patent No.: US 11,588,847 B2
(45) Date of Patent: Feb. 21, 2023

(54) AUTOMATED SEAMLESS RECOVERY

(71) Applicant: International Business Machines Corporation, Armonk, NY (US)

(72) Inventors: Lloyd Wellington Mascarenhas, White Plains, NY (US); Arielle Tovah Orazio, Wood-Ridge, NJ (US); Christopher Pepin, New Fairfield, CT (US); Matthias Seul, Pleasant Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 17/122,830

(22) Filed: Dec. 15, 2020

(65) Prior Publication Data
US 2022/0191238 A1 Jun. 16, 2022

(51) Int. Cl.
*G06F 15/173* (2006.01)
*H04L 9/40* (2022.01)
*G06F 9/4401* (2018.01)
*G06F 11/14* (2006.01)
*H04L 67/10* (2022.01)

(52) U.S. Cl.
CPC ........ *H04L 63/1441* (2013.01); *G06F 9/4403* (2013.01); *G06F 11/1464* (2013.01); *H04L 63/1416* (2013.01); *G06F 2201/805* (2013.01); *H04L 67/10* (2013.01)

(58) Field of Classification Search
CPC .............. H04L 63/1441; H04L 63/1416; G06F 9/4403; G06F 11/1464
USPC ............................ 709/223, 224, 229; 726/23
See application file for complete search history.

(56) References Cited

U.S. PATENT DOCUMENTS

| | | | |
|---|---|---|---|
| 7,111,203 B2 | 9/2006 | Hu | |
| 8,104,087 B2* | 1/2012 | Quinn | G06F 11/1402 |
| | | | 717/172 |
| 8,255,731 B1* | 8/2012 | Alsina | G06F 11/1458 |
| | | | 713/340 |
| 9,459,976 B1 | 10/2016 | Sun | |
| 10,338,991 B2 | 7/2019 | Nallabothula | |
| 2009/0177913 A1* | 7/2009 | Quinn | G06F 11/0793 |
| | | | 714/4.1 |

(Continued)

FOREIGN PATENT DOCUMENTS

| | | |
|---|---|---|
| CN | 102012789 B | 3/2014 |
| EP | 3639130 A1 | 4/2020 |

OTHER PUBLICATIONS

Anonymous. "Enterprise Tactics." Accessed Dec. 7, 2020. 2 pages. Published by Mitre. https://attack.mitre.org/tactics/enterprise/.

(Continued)

*Primary Examiner* — Liang Che A Wang
(74) *Attorney, Agent, or Firm* — Randy Tejeda

(57) ABSTRACT

A processor may detect a risk on a local machine. The processor may determine that the risk warrants a heightened-level remediation. The processor may connect the local machine to a cloud-based desktop environment. The processor may perform the heightened-level remediation on the local machine. The processor may merge data from the cloud-based desktop environment to the local machine in response to the heightened-level remediation being performed.

17 Claims, 5 Drawing Sheets

(56) References Cited

U.S. PATENT DOCUMENTS

| | | | |
|---|---|---|---|
| 2011/0258481 A1* | 10/2011 | Kern | G06F 11/1484 |
| | | | 714/E11.073 |
| 2012/0310889 A1* | 12/2012 | McNeil | H04L 67/5683 |
| | | | 707/639 |
| 2014/0006858 A1* | 1/2014 | Helfman | G06F 11/1448 |
| | | | 714/19 |
| 2014/0310222 A1 | 10/2014 | Davlos | |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Wood, D., et al., " Five Clear Steps to Enhance Secops with Mitre Att&ck_." 18 pages. Published by Cybereason.

* cited by examiner

US 11,588,847 B2

AUTOMATED SEAMLESS RECOVERY

BACKGROUND

The present disclosure relates generally to the field of cybersecurity, and more specifically to transitioning a user into a secure cloud-based desktop environment while remediation is performed on a local machine.

When a computing system is infected and the system needs remediation, quarantine, or reimaging, there is a loss of productivity for the user while waiting for issues to be remediated. Additionally, delays in detecting and responding to a risk can have significant consequences to the computing system and productivity of the user.

SUMMARY

Embodiments of the present disclosure include a method, computer program product, and system transitioning a user into a secure cloud-based desktop environment while remediation is performed on a local machine. A processor may detect a risk on a local machine. The processor may determine that the risk warrants a heightened-level remediation. The processor may connect the local machine to a cloud-based desktop environment. The processor may perform the heightened-level remediation on the local machine. The processor may merge data from the cloud-based desktop environment to the local machine in response to the heightened-level remediation being performed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
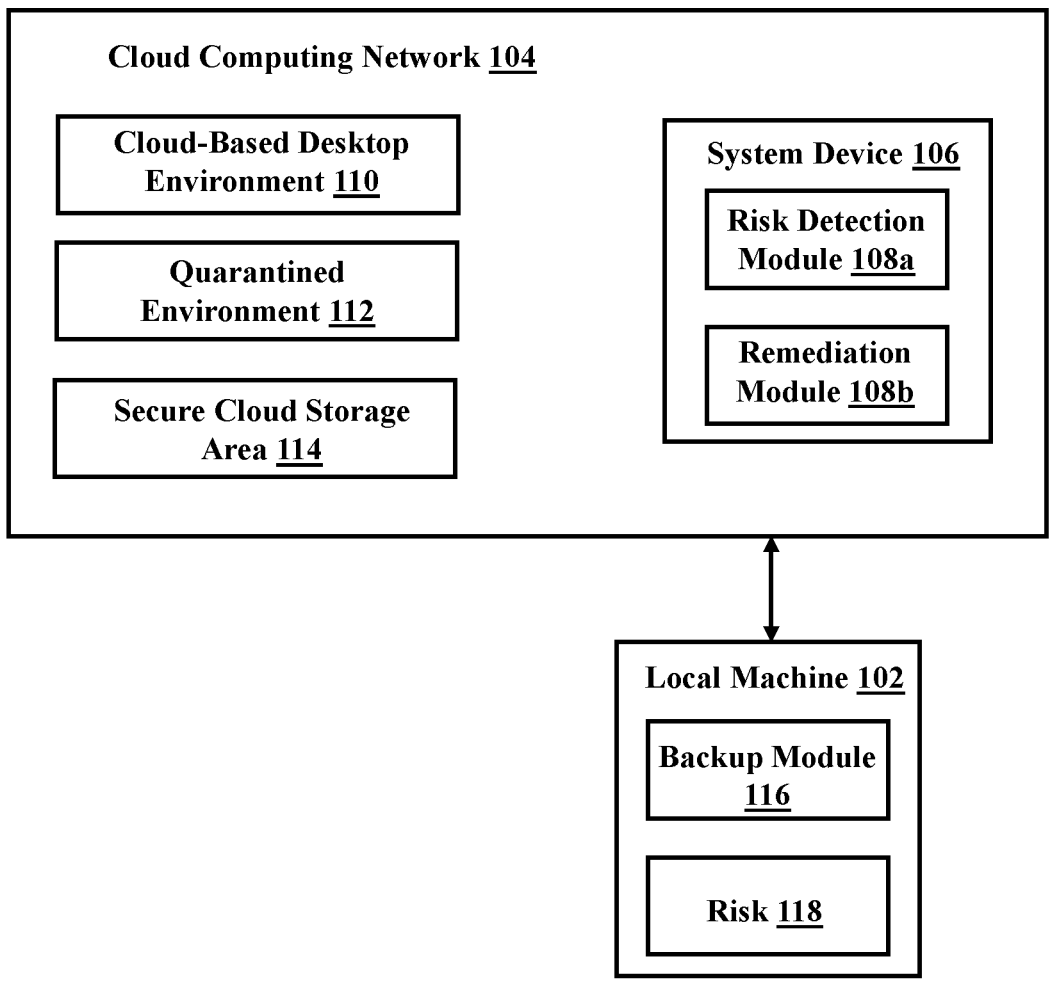
FIG. 1 is a block diagram of an exemplary system for transitioning a user into a secure cloud-based desktop environment, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cybersecurity, and more specifically to transitioning a user into a secure cloud-based desktop environment while remediation is performed on a local machine. While the present disclosure is not necessarily limited to such applications, various aspects of the disclosure may be appreciated through a discussion of various examples using this context.

In some embodiments, a processor may detect a risk on a local machine. In some embodiments, the processor may determine that the risk warrants a heightened-level remediation. For example, the processor may detect a critical problem in the software on the local machine related to a cyberattack or virus. In some embodiments, the risk may be detected by virus protection software, malware detection software, adware cleaning software, the technique or tactic of the attack (e.g., lateral movement, defense evasion, execution, etc.), etc. In some embodiments, the processor may evaluate the nature and level of the risk and determine that the risk is pervasive and persistent. In some embodiments, the processor may determine that the risk is severe enough to warrant a heightened-level remediation approach involving reimaging the local machine or other time intensive or resource intensive remediation measures.

In some embodiments, the processor may connect the local machine to a cloud-based desktop environment. In response to detecting a threat and determining the threat level, the processor may switch from running in a first mode (e.g., the mode during which the threat was detected) to running in a second mode (e.g., a safe mode and/or recovery mode). In some embodiments, information/data from the memory of the local machine may be saved to another location, such as a cloud-based quarantine location, where the information/data from the memory of the local machine is saved, quarantined, and available for risk mitigation measures to be taken.

In some embodiments, when connecting the local machine to a cloud-based desktop environment, a user of the local machine may be automatically directed to a new screen where the user may be prompted to provide login credentials associated with the local machine (e.g., login credentials related to employment). The user may then enter a desktop environment that is cloud based, and which may resemble the desktop environment of the local machine, while using the hardware of the local machine. In the cloud-based desktop environment, the user may have access to files that were on the local machine that are assessed to not pose a risk. For files that are assessed to pose a risk, versions that were saved before the risk was detected may be made accessible to the cloud-based desktop environment and current versions may be saved to a quarantined, sandboxed environment.

In some embodiments, the processor may perform heightened-level remediation on the local machine. The heightened-level remediation may involve reimaging the hard drive of the local machine. For example, the operating system and all the data of the local machine may be deleted. The operating system may be reinstalled and the factory settings of the local machine may be restored. Software applications that were previously installed on the local machine when the threat was detected may be reinstalled. Files in the memory of the local machine may be inspected for threats and then saved to the local machine. In some embodiments, after the local machine is reimaged, a persistence check may be conducted to monitor the local machine. For example, during a 48-hour period after the local machine is reimaged, the user may download some files that are infected with a virus. A persistence check may be conducted that utilizes techniques or tactics for identifying the threat, including account manipulation; any access, action, or configuration changes that let an adversary maintain a foothold on the local machine (e.g., by replacing or hijacking legitimate code or adding startup code); etc.

In some embodiments, the heightened-level remediation may involve remediation measures that may disrupt a user's ability to use the local machine. In some embodiments, the heightened-level remediation measures may be measures that are time consuming or render use of the local machine difficult (e.g., due to slow processing or disruption of processes or the user's activities on the local machine). For example, a malicious file may make registry changes to the local machine. A computer security analyst may find each file and corrupt registry and manually delete them from the local machine. This would disrupt the user's work on the local machine. Instead of disrupting the user's work, the remediation may be conducted while the user is bumped to a cloud-based desktop environment.

In some embodiments, the processor may merge data from the cloud-based desktop environment to the local machine in response to the heightened-level remediation being performed. In some embodiments, once the heightened-level remediation is completed, the user may be prompted to take steps (e.g., save documents and enter a login) to return to the local machine. In some embodiments, the user may be automatically returned to the local machine once the heightened-level remediation is completed. In some embodiments, work performed on the cloud-based desktop environment (e.g., files created, updated, or saved) may be automatically copied from the cloud-based desktop environment and saved to the local machine. In some embodiments, any files on the cloud-based desktop environment may be saved to the local machine (e.g., including files accessible through cloud backup or files that were quarantined and released).

In some embodiments, the cloud-based desktop environment may include access to one or more backup files. In some embodiments, the one or more backup files may be uploaded from the local machine to a secure cloud storage area. In some embodiments, the backup files may be saved and stored in an accessible cloud environment prior to the detection of the risk on the local machine. For example, the backup files may have been saved by a user, or automatically (e.g., on a periodic schedule), to a cloud storage service. In some embodiments, the cloud storage service may provide a crash protection service. In some embodiments, data from a local machine may be automatically collected and stored using real-time file watchers that identify when a document is created and add the document to a backup to-do list. In some embodiments, when a document is changed, the real-time file watchers may identify that a change was made and add the document to the backup to-do list.

In some embodiments, the backup files may be files that were saved by the local machine in recovery mode. In the recovery mode, the local machine may copy its entire memory to a backup location in the cloud. From the backup environment, files that are determined to be safe based on the detected risk may be made accessible to the cloud-based desktop environment.

In some embodiments, the processor may analyze one or more files in a quarantined environment. In some embodiments, the processor may send, sequentially, the one or more files to the cloud-based environment from the quarantined environment in response to the one or more files being labeled as clear. In some embodiments, not all the files from the local machine may be available to a user on the cloud-based desktop environment immediately after the user begins the cloud-based desktop session. Some files may not have been immediately released to the cloud-based desktop environment because of a perceived risk that the files may have a virus or pose another risk. Some files that were copied from the local machine may be saved to a quarantined environment where they may be accessible to remediation but not accessible directly by the user. Once a file is cleared, the file may be released from the quarantined environment and sent to the cloud-based environment. In some embodiments, files may be labeled as clear after a predetermined amount of time has passed, after the files are forensically analyzed for risks such as viruses, or after risk mitigation measures are taken to eliminate or reduce the risk associated with the files.

In some embodiments, a prioritization of analysis of the one or more files is determined based on one or more prioritization criteria. In some embodiments, the order in which to analyze the files for risks, determine that the files do not provide a high enough risk (e.g., do not reach a risk threshold) to be quarantined (e.g., should the files be prevented from being accessible to the cloud-based desktop environment?), eliminate and/or reduce the risks associated with the file (e.g., removing malware, etc.), and/or clear the files for release to the cloud-based desktop environment, may be based on one or more prioritization criteria. In some embodiments, the prioritization criteria, may include: when the file was last used or modified (e.g., if the file was not modified in the 24 hour period before the risk was detected, the file may have higher priority for earlier release), file type, or when the file first appeared on local machine. In some embodiments, the prioritization criteria may be based on considerations regarding the mitigation of the risk, including, for example, the attack vector (e.g., the type of file from which the risk originated) or estimated time of infection. In some embodiments, the prioritization criteria may be set and/or altered by a user of the system for transitioning a user to a cloud-based desktop environment.

In some embodiments, the one or more prioritization criteria may include a file type of a first file and a file type of a second file. In some embodiments the method may further include comparing the file type of the first file to the file type of the second file. For example, the first file may be a PDF file, and the second file may be a script file. In some embodiments, based on the assessed susceptibility of the file types to malware, the first file may be prioritized for analysis and release ahead of the second file (e.g., PDF files may be assessed to have less susceptibility to malware than script files and may be released to the cloud-based desktop earlier). In some embodiments, rules may be set regarding file type that specify whether a file type is permitted to be made accessible to the cloud-based desktop environment without being quarantined. The rules may also rate the susceptibility of different types of files to various types of risk. In some embodiments, based on the type of risk and the susceptibility of the file type to the risk, the file types that are less susceptible to the risk may be prioritized for earlier accessibility by the cloud-based environment (e.g., sent earlier to the cloud-based desktop environment from the quarantined environment).

In some embodiments, determining that the detected risk warrants a heightened-level remediation may include analyzing the risk based on one or more risk identification techniques. The determination may be made based on techniques of the cyberattack/breach to the system, including impact (e.g., the adversary is trying to manipulate interrupt, or destroy your systems or data), persistence (e.g., the malware has found means to reinstall itself even through reboot), command and control (e.g., the breach is now a robot type of script that performs automated tasks on command), exfiltration (e.g., the adversary is trying to steal data), execution (e.g., the adversary is trying to run malicious code), privilege escalation (e.g., the adversary is trying to gain higher-level permissions), defense evasion (e.g., the adversary is trying to avoid being detected), discovery (e.g., the adversary is trying to figure out your environment), lateral movement (e.g., the adversary is trying to move through your environment). In some embodiments, the determination may be based on an evaluation of the persistence and an the other techniques used to identify the breach to the system.

In some embodiments, determining that the detected risk warrants a heightened-level remediation approach may include determining a risk score based on indicators of the risk/compromise to the local machine and the identified technique of the cyberattack. Exemplary indicators of a compromised system may include: external remote services, replication through removable media, endpoint denial of service, data encrypted for impact, firmware corruption, exfiltration over different medium, scheduled transfer, malicious process injection in the memory, create modified system processes, malicious files downloaded, scheduled task/job, etc. In some embodiments, the risk score may be compared to a predefined threshold to determine if the risk warrants a heightened-level remediation. In some embodiments, the techniques may be identified and correlated with indicators of compromise using machine learning techniques, user behavior analysis, endpoint detection and response ("EDR"), etc.

Referring now to FIG. 1, a block diagram of a system 100 for transitioning a user into a secure cloud-based desktop environment is illustrated. System 100 includes a local machine 102 and a cloud computing network 104. The cloud computing network 104 includes a system device 106 on which a risk detection module 108a and a remediation module 108b operate. The cloud computing network 104 also includes a cloud-based desktop environment 110, a quarantined environment 112, and a secure cloud storage area 114. The local machine 102 and system device are configured to be in communication with each other. The local machine 102 may be a computing device of a user such as a personal computer. The system device 106 may be any device that contains a processor configured to perform one or more of the functions or steps described in this disclosure.

The local machine may be running with backup module(s) 116 in operation that periodically saves backup versions of files from the local machine to the secure cloud storage area 114. The system device 106 detects a risk 118 on the local machine 102 using the risk detection module 108a and determines that the risk warrants a heightened-level remediation. The local machine 102 switches modes to boot in recovery mode and performs a full memory dump saving the entire memory of the machine to the quarantined environment 112. A blue screen is triggered on the local machine 102 that notifies a user of the local machine 102 about the detected risk, need to perform heightened-level remediation, and need to connect to a cloud-based desktop environment. The local machine 102 boots into a unified extensible firmware interface ("UEFI") or alternative boot image and the cloud-based desktop environment 110 is provisioned.

The local machine 102 is connected to the cloud-based desktop environment 110 where the user may access files that were saved to the secure cloud storage area 114 prior to the detection of the risk 118. The user's data may be pulled from cloud storage in a staged approach. Files that do not pose a risk are pulled to the cloud-based desktop environment 110 first. For files that pose a risk, versions that were saved before the risk was detected may be saved to the cloud-based desktop environment 110 and current versions may be saved to a quarantined, sandboxed environment (e.g., quarantined environment 112). The system device 106 may analyze the files from the memory of the local machine 102 in the quarantined environment 112 using the remediation module 108b. The system device 106 may label one or more files in the quarantined environment 112 as clear after the files are forensically analyzed for risk or after risk mitigation measures are taken to reduce or eliminate the risk. The system device 106 may send the one or more files sequentially to the cloud-based desktop environment 110 once the files are labeled as clear. The system device 106 may prioritize the analysis of the one or more files based on one or more prioritization criteria. The one or more prioritization criteria may include a file type of a first file and a file type of a second file, and the system device 106 may prioritize the analysis by comparing the first file type to the second file type.

Heightened-level remediation may be performed on the local machine 102 by reimaging the local machine 102. The system device 106 may merge data from the cloud-based desktop environment 110 to the local machine 102 in response to the heightened-level remediation being performed.

Figure 2:
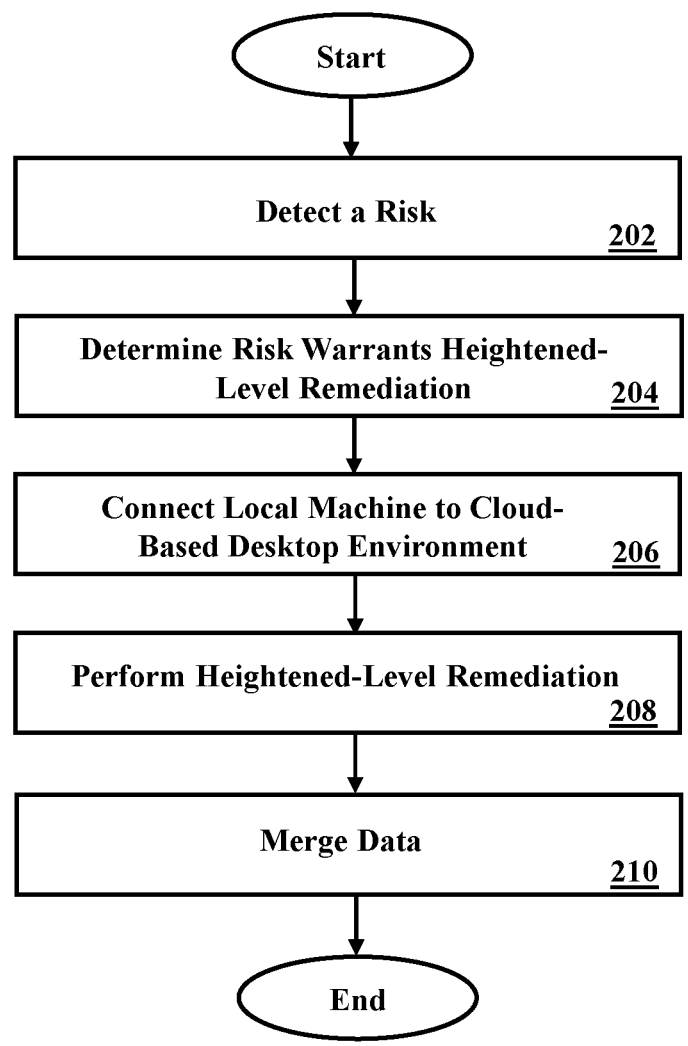
FIG. 2 is a flowchart of an exemplary method for transitioning a user into a secure cloud-based desktop environment, in accordance with aspects of the present disclosure.

Referring now to FIG. 2, illustrated is a flowchart of an exemplary method 200 for transitioning a user into a secure cloud-based desktop environment, in accordance with embodiments of the present disclosure. In some embodiments, a processor of a system (such as the system 100 of FIG. 1) may perform the operations of the method 200. In some embodiments, method 200 begins at operation 202. At operation 202, the processor detects a risk on a local machine. In some embodiments, method 200 proceeds to operation 204, where the processor determines that the risk warrants a heightened-level remediation. In some embodiments, method 200 proceeds to operation 206. At operation 206, the processor connects the local machine to a cloud-based desktop environment. In some embodiments, method 200 proceeds to operation 208. At operation 208, the processor performs the heightened-level remediation on the local machine. In some embodiments, method 200 proceeds to operation 210. At operation 210, the processor merges data from the cloud-based desktop environment to the local machine in response to the heightened-level remediation being performed. In some embodiments, the method may end after operation 210.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
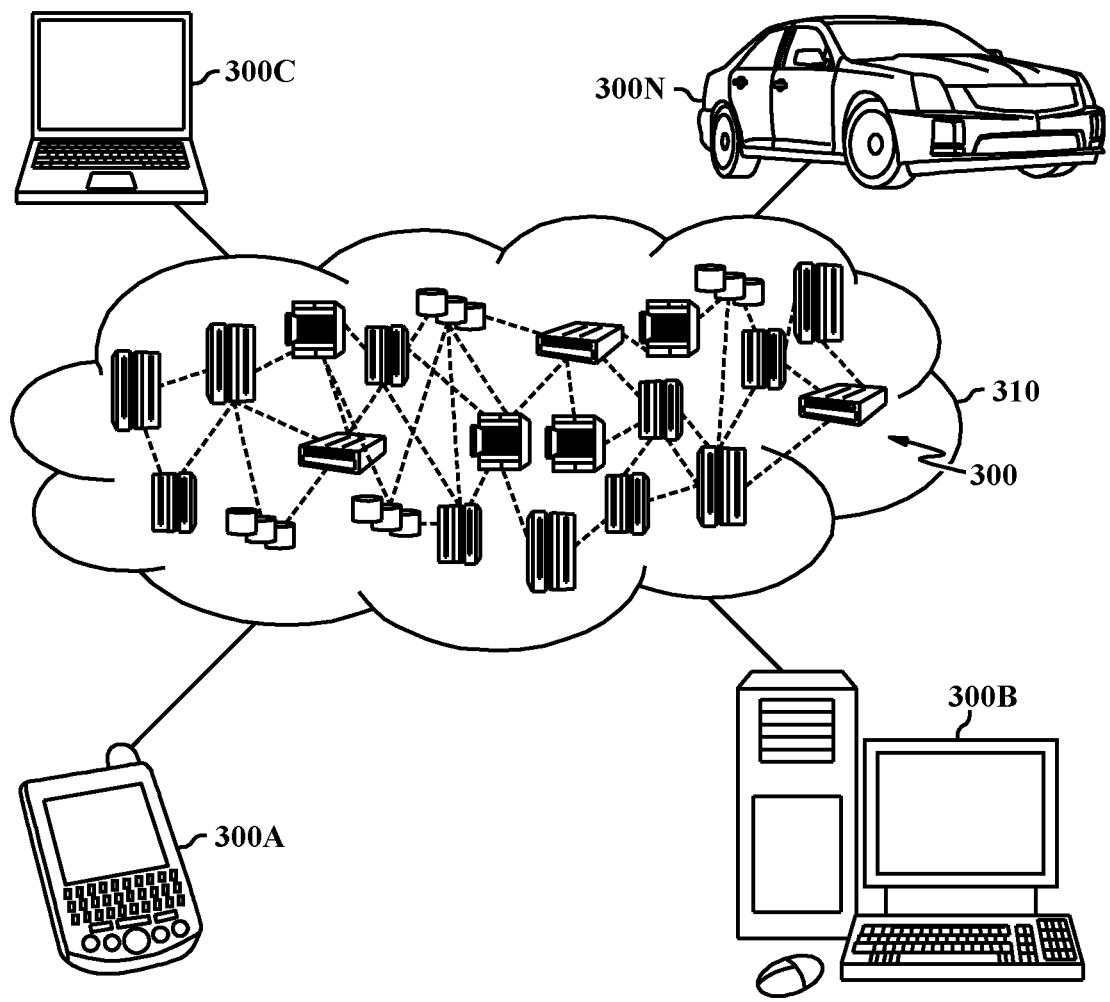
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
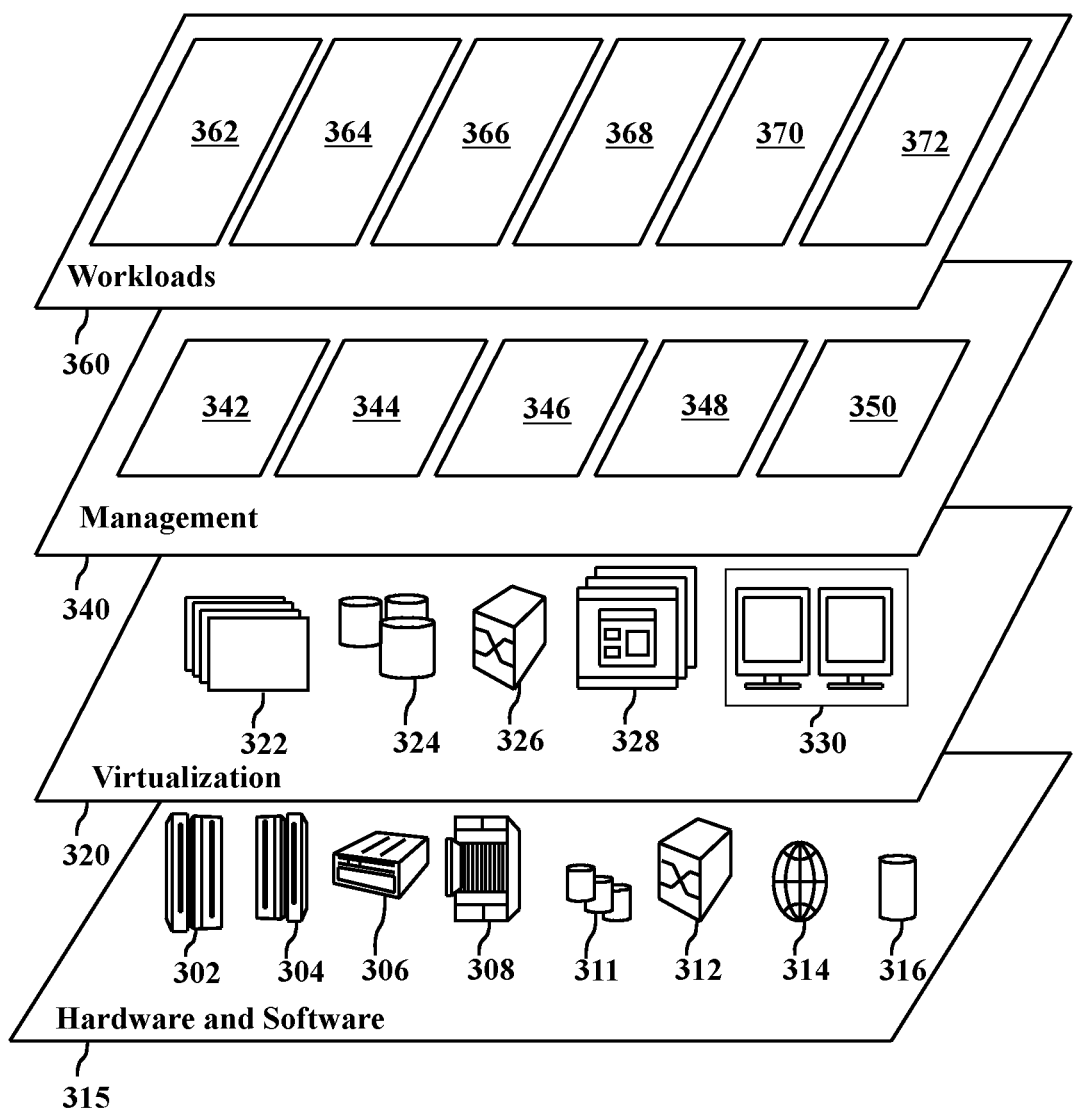
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and transitioning a user into a secure cloud-based desktop environment 372.

Figure 4:
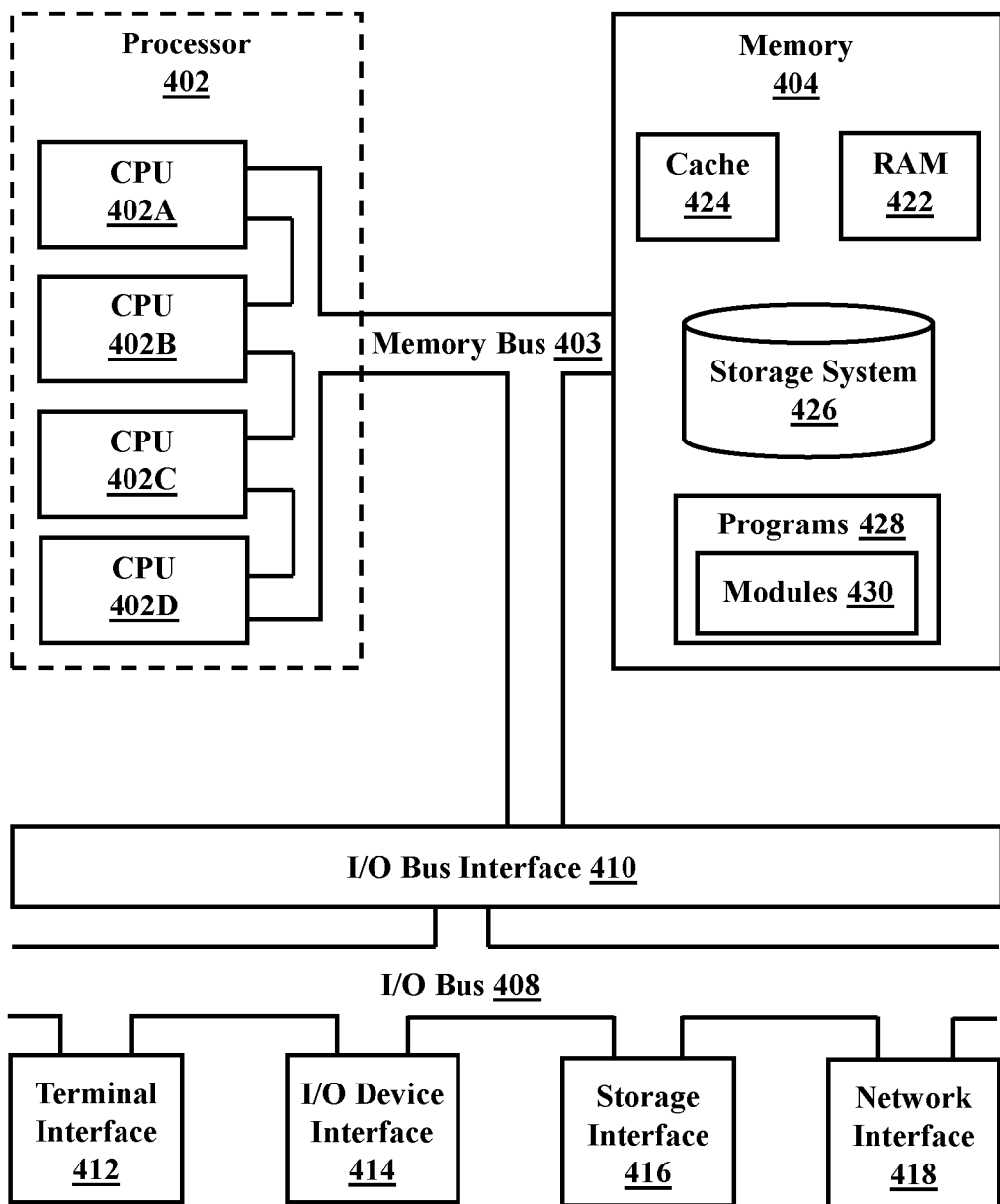
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   detecting, by a processor, a risk associated with one or more files on a local machine;
   determining that the risk warrants a heightened-level remediation;
   connecting the local machine to a cloud-based desktop environment;
   performing the heightened-level remediation on the local machine, wherein performing the heightened-level remediation, comprises:
      responsive to one or more files associated with a level of risk, making available one or more prior versions of the one or more files associated with the level of risk in the cloud-based desktop environment;
      saving one or more current versions of the one or more files associated with the level of risk to a quarantined environment;
      analyzing the one or more saved files in the quarantined environment;
      sending the one or more files to the cloud-based environment from the quarantined environment in response to the one or more analyzed files being labeled as clear; and
   merging data from the cloud-based desktop environment to the local machine in response to the heightened-level remediation being performed.

2. The method of claim 1, wherein connecting the local machine to the cloud-based desktop environment includes booting the local machine into a recovery mode.

3. The method of claim 1, wherein the cloud-based desktop environment includes access to one or more backup files, wherein the one or more backup files are uploaded from the local machine to a secure cloud storage area.

4. The method of claim 1, wherein a prioritization of analysis of the one or more files is determined based on one or more prioritization criteria.

5. The method of claim 4, wherein the one or more prioritization criteria includes a file type of a first file and a file type of a second file, and wherein the method further includes:
   comparing the file type of the first file to the file type of the second file.

6. The method of claim 1, wherein determining that the risk warrants a heightened-level remediation includes analyzing the risk based on one or more risk identification techniques.

7. A system comprising:
   a memory; and
   a processor in communication with the memory, the processor being configured to perform operations comprising:
   detecting a risk associated with one or more files on a local machine;
   determining that the risk warrants a heightened-level remediation;
   connecting the local machine to a cloud-based desktop environment;
   performing the heightened-level remediation on the local machine, wherein performing the heightened-level remediation, comprises:
      responsive to one or more files associated with a level of risk, making available one or more prior versions of the one or more files associated with the level of risk in the cloud-based desktop environment;
      saving one or more current versions of the one or more files associated with the level of risk to a quarantined environment;
      analyzing the one or more saved files in the quarantined environment;
      sending the one or more files to the cloud-based environment from the quarantined environment in response to the one or more analyzed files being labeled as clear; and
   merging data from the cloud-based desktop environment to the local machine in response to the heightened-level remediation being performed.

8. The system of claim 7, wherein connecting the local machine to the cloud-based desktop environment includes booting the local machine into a recovery mode.

9. The system of claim 7, wherein the cloud-based desktop environment includes access to one or more backup files, wherein the one or more backup files are uploaded from the local machine to a secure cloud storage area.

10. The system of claim 7, wherein a prioritization of analysis of the one or more files is determined based on one or more prioritization criteria.

11. The system of claim 10, wherein the one or more prioritization criteria includes a file type of a first file and a file type of a second file, and wherein the processor is further configured to perform operations comprising:
   comparing the file type of the first file to the file type of the second file.

12. The system of claim 7, wherein determining that the risk warrants a heightened-level remediation includes analyzing the risk based on one or more risk identification techniques.

13. A computer program product comprising a computer readable storage medium having program instructions embodied therewith, the program instructions executable by a processor to cause the processor to perform operations, the operations comprising:
   detecting a risk associated with one or more files on a local machine;
   determining that the risk warrants a heightened-level remediation;
   connecting the local machine to a cloud-based desktop environment;
   performing the heightened-level remediation on the local machine, wherein performing the heightened-level remediation, comprises:
      responsive to one or more files associated with a level of risk, making available one or more prior versions of the one or more files associated with the level of risk in the cloud-based desktop environment;
      saving one or more current versions of the one or more files associated with the level of risk to a quarantined environment;
      analyzing the one or more saved files in the quarantined environment;
      sending the one or more files to the cloud-based environment from the quarantined environment in response to the one or more analyzed files being labeled as clear; and
   merging data from the cloud-based desktop environment to the local machine in response to the heightened-level remediation being performed.

14. The computer program product of claim 13, wherein the cloud-based desktop environment includes access to one or more backup files, wherein the one or more backup files are uploaded from the local machine to a secure cloud storage area.

15. The computer program product of claim 13, wherein a prioritization of analysis of the one or more files is determined based on one or more prioritization criteria.

16. The computer program product of claim 15, wherein the one or more prioritization criteria includes a file type of a first file and a file type of a second file, and wherein the processor is further configured to perform operations comprising:
   comparing the file type of the first file to the file type of the second file.

17. The computer program product of claim 13, wherein determining that the risk warrants a heightened-level remediation includes analyzing the risk based on one or more risk identification techniques.

* * * * *